(12) United States Patent
Srinivasan

(10) Patent No.: US 8,204,006 B2
(45) Date of Patent: Jun. 19, 2012

(54) METHOD AND SYSTEM FOR COMMUNICATING DIGITAL VOICE DATA

(75) Inventor: Ramesh Srinivasan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 818 days.

(21) Appl. No.: 11/440,969

(22) Filed: May 25, 2006

(65) Prior Publication Data

US 2007/0276654 A1    Nov. 29, 2007

(51) Int. Cl.
 *H04W 4/00* (2009.01)
 *H04J 3/16* (2006.01)
(52) U.S. Cl. ........................ 370/329; 370/437
(58) Field of Classification Search ................. 370/235, 370/236, 236.1, 465, 252, 328, 329, 437; 709/226, 229; 711/147, 151
See application file for complete search history.

(56) References Cited

U.S. PATENT DOCUMENTS

| | | | |
|---|---|---|---|
| 6,445,731 B1 * | 9/2002 | Yamano et al. | 375/222 |
| 6,665,271 B1 * | 12/2003 | Thomas et al. | 370/252 |
| 6,879,667 B1 | 4/2005 | Carew et al. | |
| 6,898,678 B1 * | 5/2005 | Six et al. | 711/151 |
| 6,954,463 B1 | 10/2005 | Ma et al. | |
| 7,149,527 B2 * | 12/2006 | Chen et al. | 455/452.1 |
| 7,233,600 B1 | 6/2007 | Chau et al. | |
| 2002/0154646 A1 * | 10/2002 | Dubois et al. | 370/406 |
| 2003/0236901 A1 | 12/2003 | Barazesh et al. | |
| 2004/0010437 A1 * | 1/2004 | Kiran et al. | 705/8 |
| 2005/0027966 A1 * | 2/2005 | Hu et al. | 712/36 |
| 2005/0047400 A1 | 3/2005 | Ansley | |
| 2006/0104227 A1 * | 5/2006 | Chuang | 370/328 |

FOREIGN PATENT DOCUMENTS

WO    WO98/51067 A1    11/1998
WO    WO02/096072 A1    11/2002

OTHER PUBLICATIONS

"Troubleshooting Unrecognized Voice Interface Cards on Cisco 1750, 1751, and 1760 Routers, Cisco Technical Support and Documentation", Document ID 5711, Feb. 2, 2006, 10 Pages.
"Configuring Analog Voice Ports", Cisco IOS Voice Port Configuration Guide, 11 pages, Release 12.3, May 2005.
"IOS Voice Command Reference"; Release 12.3: voice local-bypass; obtained at http://web.archive.org/web/20050319171707/http://www.cisco.com/en/US/products_command_reference_chapter09186a00800b3513.html; Sep. 11, 2009; 8 pages.

* cited by examiner

*Primary Examiner* — Chi Pham
*Assistant Examiner* — Feben M Haile
(74) *Attorney, Agent, or Firm* — Fish & Richardson P.C.

(57) ABSTRACT

Methods and systems have been provided for communicating digital voice data. According to various embodiments of the invention, a user interface is provided at a network device in the presence of DSP resources. Selection is made by the user interface about whether to use the DSP resources. Based on the selection, the digital voice data is communicated. Selection of bypassing a DSP resource is made by default if no DSP resources are present.

20 Claims, 4 Drawing Sheets

METHOD AND SYSTEM FOR COMMUNICATING DIGITAL VOICE DATA

BACKGROUND OF THE INVENTION

1. Field of Invention

Embodiments of the invention relate, in general, to the communication of digital data. More specifically, embodiments of the invention relate to methods and systems for a selective processing of digital voice data during communication.

2. Description of the Background Art

Digital voice is transmitted across networks for various applications. During the transmission, digital voice passes through a host of routers. Routers and other equipment that are located at a customer's site for connecting the customer to an access circuit are known as Customer Premises Equipment (CPE). Incoming digital voice into a CPE router can terminate at the CPE router. The incoming digital voice into the CPE router may also be transmitted to another router. Additionally, the incoming digital voice may be transmitted to a user device. Examples of a user device include a desktop, a laptop, and a palmtop on a local network of the router.

When the incoming digital voice in a router is transmitted further across the network, the quality of voice degrades. A manifestation of degradation in the quality of the digital voice is echo generation. The digital voice can be strengthened by using processing techniques at the CPE router such as echo cancellation and transcoding. A form of signal processing technique used is Digital Signal Processing (DSP). DSP improves the accuracy and reliability of digital signals. DSP also helps in echo cancellation when the digital signals correspond to the digital voice. Additionally, DSP helps in transcoding voice signals from one compression technique to another.

The existing CPE routers have DSP resources configured for each multiple interface. An interface bridges the digital signals that are transmitted from one communication link to another. Typically, a plurality of interfaces exists on a CPE router. The existing CPE routers have as many DSP resources configured as the number of interfaces that exist on the CPE routers. Consequently, DSP resources get configured even on those interfaces over which the digital voice is frequently terminated. In such cases, the DSP resources may be underutilized or not used at all. Alternatively, the DSP resources are used in digital voice paths even when the DSP resources are not required at all. This is because of architectural and configuration limitations on the existing CPE routers.

DETAILED DESCRIPTION OF EMBODIMENTS OF THE INVENTION

Various embodiments of the invention provide methods, systems, and computer-readable media for communicating digital voice data. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Various embodiments of the invention provide a method for digital voice data communication. The method provides a user interface for selectively using DSP resources for transmitting and transcoding the digital voice data. In an embodiment, the user interface is a Command Line Interface (CLI). The digital voice data is transported through a DSP resource if the DSP resource is selected through the CLI. In other embodiments, other ways to configure or control DSP resources can be used such as a graphical user interface, automated configuration, etc.

Figure 1:
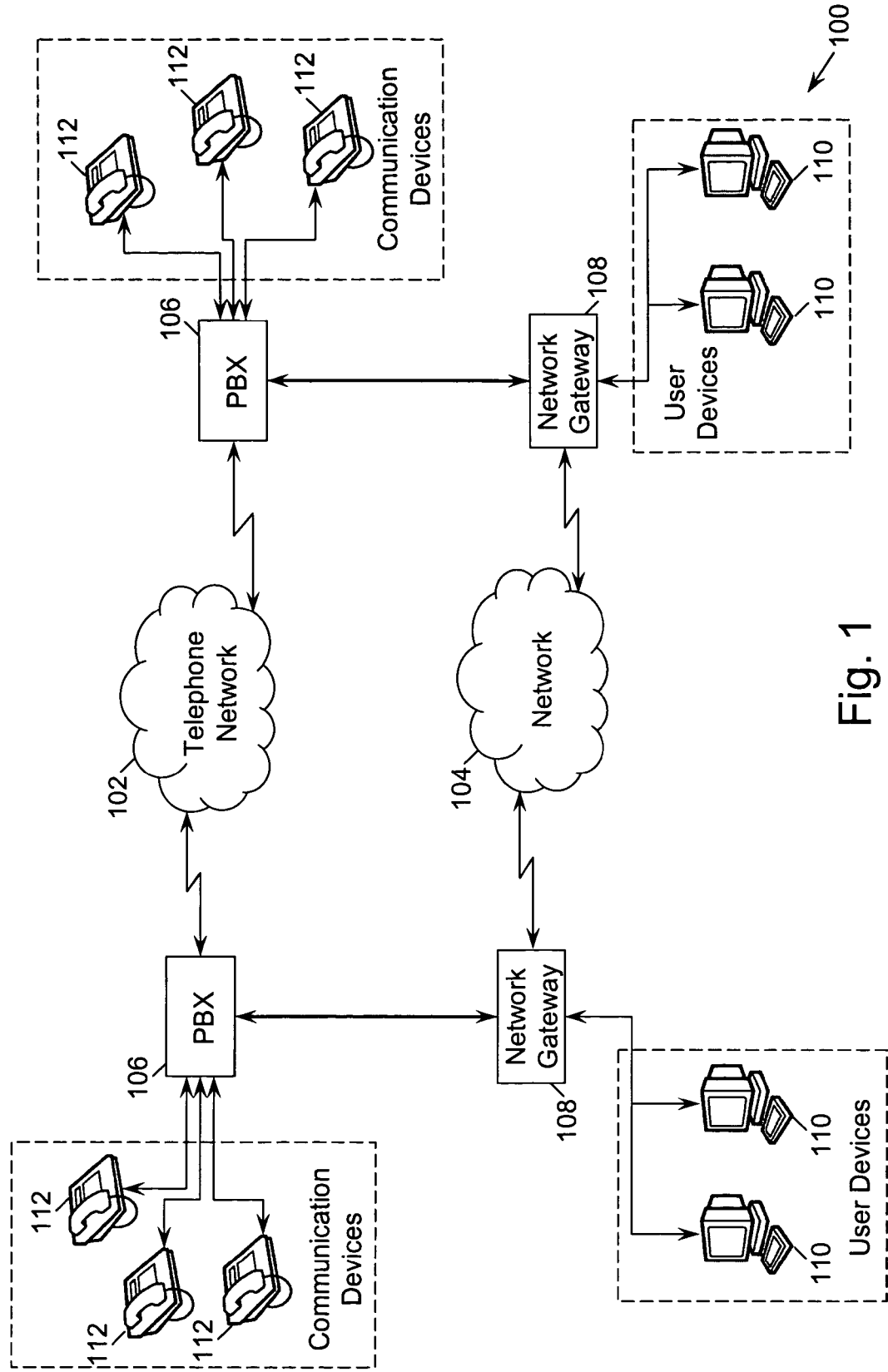
FIG. 1 illustrates an environment for communicating digital voice data in accordance with an exemplary embodiment of the present invention.

Referring now to the drawings, more particularly by their reference numbers, FIG. 1 illustrates environment 100 for communicating digital voice data in accordance with an exemplary embodiment of the present invention. Environment 100 comprises telephone network 102, network 104, Private Branch eXchanges (PBXs) 106, network gateway 108, user devices 110, and communication devices 112. Telephone network 102 is an electronic communications circuit switched network that provides telephone services. Examples of the telephone services include speech communications, facsimile, data, and so forth. Examples of telephone network 102 include, but are not limited to, Public Switched Telephone Network (PSTN) and Integrated Services Digital Network (ISDN). The PSTN relates to public circuit-switched telephone networks. ISDN is a circuit-switched telephone network system for the digital transmission of voice and data.

For example, during a videoconference, ISDN provides simultaneous transmission of voice, video, and text between individual desktop videoconferencing systems and group videoconferencing systems. Voice is communicated to communication devices 112 over telephone network 102 through PBXs 106. Private Branch eXchange (PBX) 106 is a telephone exchange system that provides a single point connection between communication devices 112 and telephone network 102. Communication devices 112 are used to transmit and receive voice along with data. Examples of communication devices 112 include telephone sets, cordless handsets, mobile phones, fax machines, modems, and so forth. Communication devices 112 can be fixed or wireless communication devices.

Telephone network 102 is interlinked with network 104. Network 104 is a computer packet based network in a specific location involving a number of computers. Examples of network 104 are Personal Area Network (PAN), Local Area Network (LAN), Metropolitan Area Network (MAN), and Wide Area Network (WAN). Network 104 includes network devices 108 and user devices 110 that are interconnected to one another. In an embodiment of the invention, network devices are network gateway 108. Although the invention is described with reference to network gateway 108, in alternate embodiments, the network devices can be network access routers, bridges, or switches. Network gateway 108 communicates, directs, and transfers data across network 104. Network 104 can include more than one network gateway 108. User devices 110 are network communication devices available to the end users in network 104. Examples of user devices 110 include Personal Computers (PCs), laptops, palmtops, tablet PCs, mobile phones, Personal Digital Assistants (PDAs), and so forth.

Figure 2:
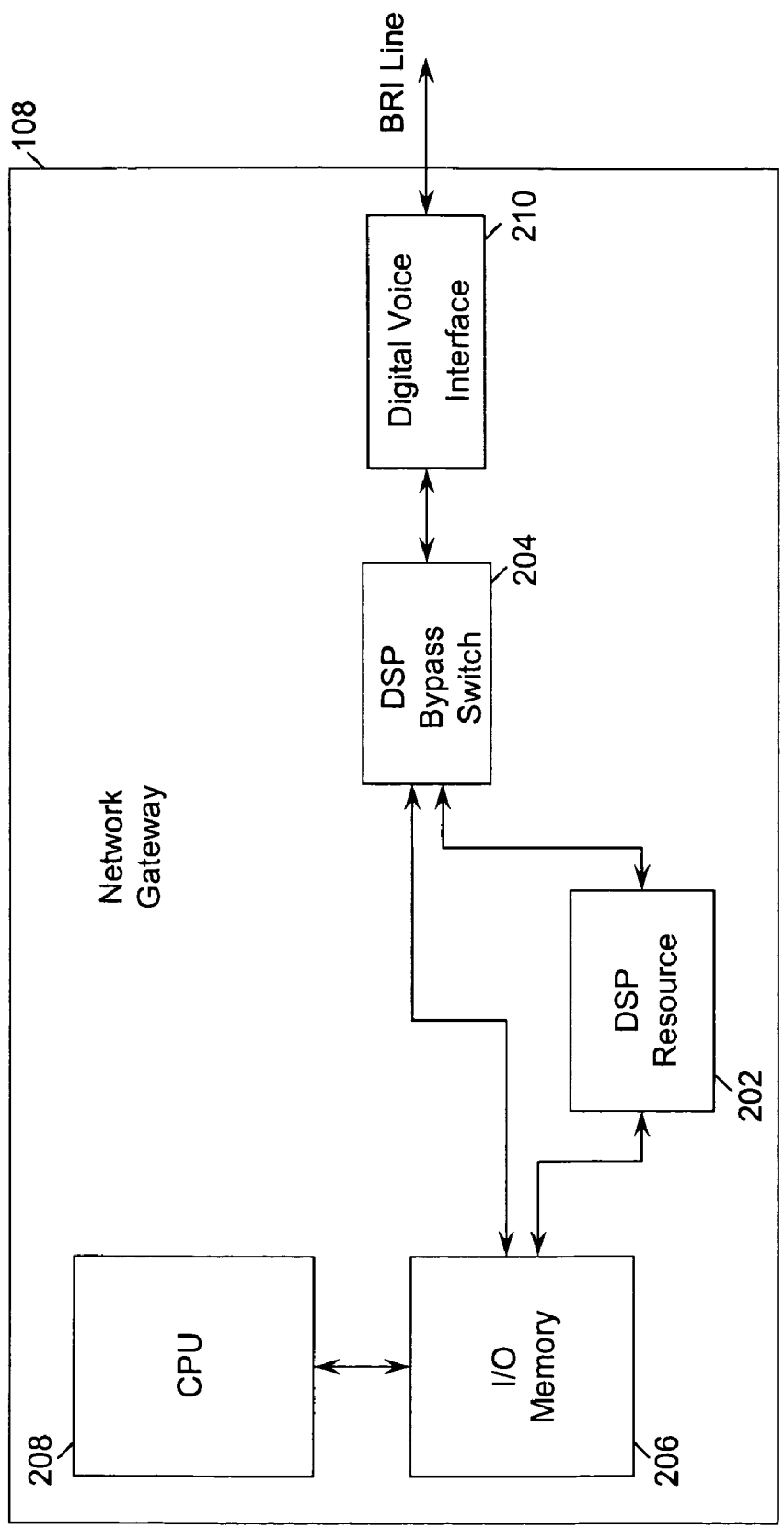
FIG. 2 is a block diagram of a network device in accordance with an exemplary embodiment of the present invention.

FIG. 2 is a block diagram of network gateway 108 in accordance with an exemplary embodiment of the present invention. Network gateway 108 comprises Digital Signal Processing (DSP) resource 202, DSP bypass switch 204, Input-Output (I/O) Memory 206, Central Processing Unit (CPU) 208 and digital voice interface 210.

Command Line Interface (CLI) is a user interface that allows an end-user to enter commands with a simple text. The commands are known as CLI commands. The CLI is used to provide a CLI command for selecting DSP resource 202 for processing digital voice data. One or more DSP resources 202 may be present on network gateway 108. DSP resource 202 is selected to process digital voice data for transmission to network gateway 108. While transmitting the digital voice data to network gateway 108, DSP resource 202 helps in echo-cancellation of the digital voice data. Further, DSP resource 202 is used to transcode the digital voice data. Transcoding is the act of transformation of digital voice data from one compression technique to another. In an embodiment, dedicated DSP resources 202 are located on both the ingress and egress paths in network gateway 108. In another embodiment, DSP resources 202 are present in PBX 106.

Based on the CLI command entered by the end user, DSP bypass switch 204 allows the digital voice data to be transported through DSP resource 202. DSP bypass switch 204 is an electrical switch in network device 108 that is connected with digital voice interface 210. DSP bypass switch 204, which is configurable by the end user, can transport digital voice data packets for processing through DSP resource 202 prior to being stored in I/O memory 206. Or else, DSP bypass switch 204 can directly get the digital voice data packets stored in I/O memory 206 by passing DSP resource 202. Digital voice interface 210 is linked to I/O memory 206 through DSP bypass switch 204. One or more digital voice interfaces 210 are present on network gateway 108. Digital voice interface 210 is used to transport voice and data. Examples of digital voice interface 210 are Basic Rate Interface (BRI) and Primary Rate Interface (PRI). BRI and PRI are two kinds of interfaces that can access ISDN. In ISDN, there are two types of channels, namely Bearer channel (B-channel) and Delta channel (D-channel). B-channels are used for data, with voice. D-channels are used for signaling, and controlling. D-channels can also be used for transmitting very low bandwidth data using the well-known X.25 protocol over D-channel. BRI is an ISDN configuration consisting of two B-channels and one D-channel. PRI contains a larger number of B-channels and one D-channel. Examples of PRI include T-carrier (T1) and E-carrier (E1). T1 comprises twenty-three B-channels and one D-channel. E1 comprises thirty B-channels and one D-channel.

I/O (Input/Output) memory 206 is the electronic holding place in network device 202 for incoming and/or outgoing data through any of its network interfaces. Further, I/O memory 206 holds recently accessed data for CPU 208 to have quick access. Once the digital voice data passes through I/O memory 206, CPU 208 is notified. CPU 208 locates the required egress path for a digital voice data packet. The path is located from a routing table or a switching table. Then, CPU 208 executes the required sequence of operations to initiate delivery of the digital voice data packets through appropriate outgoing digital voice interface 210 of network device 108.

In an embodiment, the end user enters a command on the CLI to bypass DSP resource 202. Subsequently, DSP bypass switch 204 ensures the direct transmission of the digital voice data to I/O memory 206. In this case, DSP resource 202 is not used since the digital voice data is not transported through it. Further, the CLI command to bypass DSP resource 202 is entered by default when there is no DSP resource 202 present on network gateway 108.

In an alternative embodiment, the end user enters a command to use DSP resource 202. Subsequently DSP bypass switch 204 ensures that the digital voice data is transported to I/O memory 206 through DSP resource 202, wherein the digital voice data packet undergoes echo cancellation and transcoding.

Figure 3:
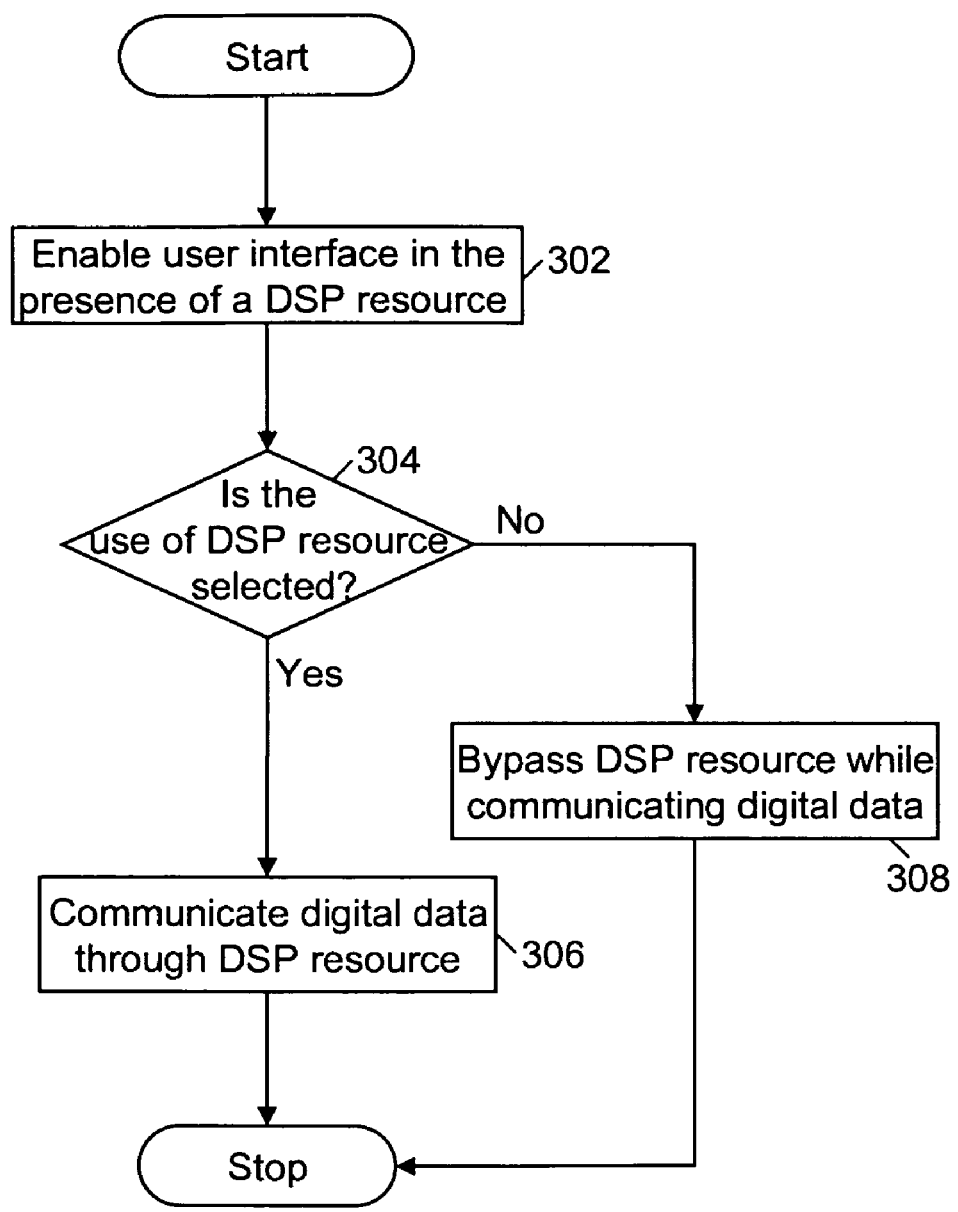
FIG. 3 is a flowchart illustrating a method for communicating digital voice data in accordance with an exemplary embodiment of the present invention.

FIG. 3 is a flowchart illustrating a method for communicating digital voice data in accordance with an exemplary embodiment of the present invention. At 302, a user interface is enabled in the presence of DSP resource 202. The user interface is a CLI. At 304, a selection is made regarding the use of DSP resource 202. The selection is performed by the end-user. The selection is made through the CLI by providing a CLI command. In an embodiment, the CLI command is 'dsp services bypass'. Providing 'dsp services bypass' command through CLI for digital voice interface 210 enables DSP bypass switch 204 to bypass DSP resource 202 while communicating digital voice data. If DSP resource 202 is to be used for digital voice interface 210, a 'no' form of the command 'dsp services bypass' is used through CLI. The 'no' form of the command 'dsp services bypass' is 'no dsp services bypass'. Providing the 'no dsp services bypass' command disables the 'dsp services bypass' command. If the selection is made to use DSP resource 202, then at 306, the digital voice data is transported through DSP resource 202. If the selection is made to bypass DSP resource 202, then at 308, the digital voice data is transported by passing DSP resource 202. In this case, DSP resource 202 is not required and can also be physically removed.

The CLI command 'dsp services bypass' is set by default for digital voice interfaces 210 when there is no DSP resource 202 present on network gateway 108. The end user cannot change the default setting, unless there is DSP resource 202 available on network device 108 for digital voice interface 210. Further, in an embodiment, less than required number of DSP resources 202 can be available on network gateway 108 for allocation, as compared to the number of digital voice interfaces 210. In this case, the 'dsp services bypass' command is set by default for digital voice interfaces 210 for which DSP resources 202 are not allocated.

Figure 4:
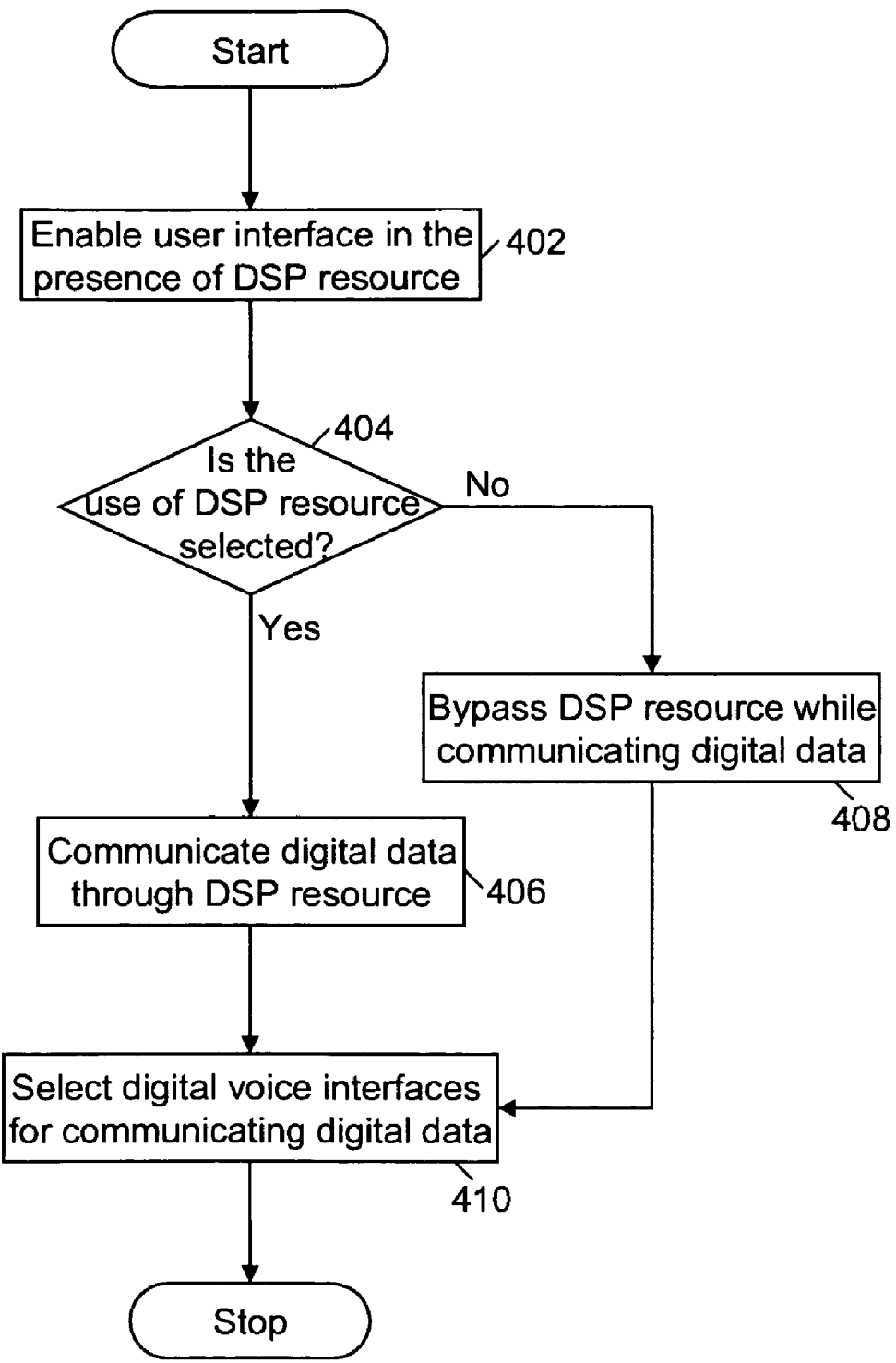
FIG. 4 is a flowchart illustrating a method for communicating digital voice data in accordance with another exemplary embodiment of the present invention.

FIG. 4 is a flowchart illustrating a method for communicating digital voice data in accordance with an exemplary embodiment of the present invention. At 402, a user interface is enabled in the presence of DSP resource 202. The user interface is a CLI. At 404, a selection is made about whether to use DSP resource 202. The end-user makes the selection through the CLI by providing a CLI command. As mentioned earlier, the CLI command is 'dsp services bypass'. The 'dsp services bypass' command enables DSP bypass switch 204 to bypass DSP resource 202 while communicating digital voice data. If DSP resource 202 is to be used for digital voice interface 210, a 'no' form of the command 'dsp services bypass' is used through the CLI. Providing the 'no' form of 'dsp services bypass' disables the 'dsp services bypass' command. If the selection is made to use DSP resource 202, then at 406, the digital voice data is transported through DSP resource 202. At 410, digital voice interface 210 is selected to communicate the digital voice data. If at 404 the selection is made to bypass DSP resource 202, then at 408, the digital voice data is transported by passing DSP resource 202. At 410, digital voice interface 210 is selected to communicate the digital voice data.

In another embodiment of the invention, the CLI command provided for selecting DSP resource 202 is 'dsp services dspfarm' when digital voice interface 210 is a PRI. Providing the 'dsp services dspfarm' command enables the use of DSP resource 202. In case DSP resource 202 is not to be used, the 'no' form of the 'dsp services dspfarm' command is provided. The 'no' form of the 'dsp services dspfarm' command is 'no dsp services dspfarm'. Further, network gateway 108 is equipped with one or more 'High Density Voice Network Module' (NM-HDV) to provide DSP resources 202. In another embodiment, network gateway 108 is equipped with one or more 'High Density Voice transcoding and conferencing DSP farm Network Module' (NM-HDV-FARM), to provide DSP resources 202.

In an embodiment of the invention, the selection of whether to use DSP resources 202 through the CLI is done on the basis of variations in incoming digital voice traffic profiles during the course of a day. The day is fragmented into time zones based on required usage of DSP resources 202. In an embodiment, based on the amount of incoming digital voice data that requires processing through DSP resources 202, the day is fragmented into times of high and low use of DSP resources 202 for different digital voice interfaces 210 on network gateway 108. In another embodiment of the invention, the selection of whether to use DSP resources 202 through the CLI is done based on traffic flow of the digital voice data through digital voice interfaces 210.

Various embodiments of the invention provide a method to selectively use DSP resources 202 on each digital voice interface 210. This results in avoiding installation of redundant DSP resources 202. The redundancy is avoided by having lesser number of DSP resources 202 on network gateway 108. Further, DSP resources 202 can be sourced from PBX 106. Therefore, the transcoding and echo-cancellation can be done at PBX 106 instead of being done at network gateway 108. As a result, DSP resources 202 are not required to be present on network gateway 108. Consequently, the invention helps in saving substantial costs incurred by providing the capability to dispense with the installation of redundant DSP resources 202. The cost savings are substantial especially in the highly sensitive low-end access router space. Therefore, the invention has an advantage over the existing technologies such as MC3810, on which DSP resources are present by default.

Although the invention has been discussed with respect to specific embodiments thereof, these embodiments are merely illustrative, and not restrictive, of the invention. For example, a 'method for communicating digital voice data' can include any type of analysis, manual or automatic, to anticipate the needs of communicating digital voice data.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    enabling a user interface that interacts with digital signal processing (DSP) resources on a network gateway, wherein the user interface enables an end-user to enter a command for allocating the DSP resources for processing digital voice data for transmission to the network gateway, wherein the network gateway is coupled to the DSP resources via a DSP bypass switch, wherein the DSP bypass switch enables the network gateway to bypass the DSP resources in order to access a memory;
    dividing, at the network gateway, a time amount in a day into a plurality of time periods, wherein the time periods are based on amounts of incoming digital voice data that are configured for processing through DSP resources on a per network interface bases, wherein the time periods include at least one low-use time period and at least one high-use time period;
    receiving, at the network gateway, the command from the user interface, wherein the command indicates how to allocate the DSP resources for processing the digital voice data based on variations in the amounts of incoming digital voice data that require processing through the DSP resources and based on a current time period with respect to the plurality of time periods, and wherein a selection of the command is performed through the user interface; and
    transporting, in the network gateway, the digital voice data based on the selection, whereby the digital voice data is transported through the DSP resources based on the selection is performed to use the DSP resource.

2. The method of claim 1, wherein enabling the user interface comprises providing a command in a command line interface (CLI).

3. The method of claim 1, wherein indicating how to allocate the DSP resources further comprises selecting one or more digital interfaces for transporting the digital voice data.

4. The method of claim 1, wherein indicating how to allocate the DSP resources comprises providing a command line interface (CLI) command, and wherein the CLI command bypasses use of the DSP resource.

5. The method of claim 4, wherein providing a CLI command comprises providing the CLI command for bypassing the use of the DSP resources if no DSP resource is present.

6. The method of claim 1, wherein indicating how to allocate the DSP resources further comprises allocating the DSP resources based on times of day.

7. The method of claim 1, wherein indicating how to allocate the DSP resources further comprises allocating the DSP resources on a basis of traffic flow of the digital voice data.

8. The method of claim 1, wherein a command to bypass the DSP resources is entered by default when there is no DSP resource available to the network gateway.

9. The method of claim 8, wherein the end-user cannot change a default setting to enter a command to use the DSP resources unless there is a DSP resource available to the network gateway.

10. The method of claim 1, wherein a command to bypass the DSP resources is entered by default for network gateways for which DSP resources are not allocated.

11. The method of claim 1, wherein the DSP bypass switch facilitates allocation of DSP resources when there are fewer DSP resources available to a network gateway than a number of total DSP resources required to satisfy all of the network interfaces on that network gateway.

12. The method of claim 1, further comprising determining a usage of DSP resources for a plurality of packets, wherein one or more packets of a first set of packets requires processing through the DSP resource, wherein one or packets of a second set of packets that does not necessarily require immediate processing through the DSP resource.

13. A system comprising:
    a processor; and
    instructions that when executed on the processor cause the processor to perform instructions that include:
        enabling a user interface that interacts with digital signal processing (DSP) resources on a network gateway, wherein the user interface enables an end-user to enter a command for allocating the DSP resources for processing digital voice data for transmission to the network gateway, wherein the network gateway is coupled to the DSP resources via a DSP bypass switch, wherein the DSP bypass switch enables the network gateway to bypass the DSP resources in order to access a memory;

dividing, at the network gateway, a time amount in a day into a plurality of time periods, wherein the time periods are based on amounts of incoming digital voice data that are configured for processing through DSP resources on a per network interface bases, wherein the time periods include at least one low-use time period and at least one high-use time period;

receiving, at the network gateway, the command from the user interface, wherein the command indicates how to allocate the DSP resources for processing the digital voice data based on variations in the amounts of incoming digital voice data that require processing through the DSP resources and based on a current time period with respect to the plurality of time periods, and wherein a selection of the command is performed through the user interface; and transporting, in the network gateway, the digital voice data based on the selection, whereby the digital voice data is transported through the DSP resources based on if the selection is performed to use the DSP resource.

14. The system of claim 13, the instructions that when executed on the processor cause the processor to perform instructions that further include: determining a usage of DSP resources for a plurality of packets, wherein one or more packets of a first set of packets requires processing through the DSP resource, wherein one or packets of a second set of packets that does not necessarily require immediate processing through the DSP resource.

15. A system comprising:

a network device adapted for communicating digital voice data, wherein the network device comprises a user interface for selecting whether to process the digital voice data, wherein the user interface allows an end-user to enter a command for allocating digital signal processing (DSP) resources for processing digital voice data for transmission to a network gateway, wherein the network device divides a time amount in a day into a plurality of time periods, wherein the plurality of time periods are based on amounts of incoming digital voice data that require processing through DSP resources on a per network interface bases, wherein the time periods include at least one low-use time period and at least one high-use time period, wherein the user interface enables an end-user to enter a command for allocating the DSP resources for processing digital voice data for transmission to a network gateway, wherein the network gateway is coupled to the DSP resources via a DSP bypass switch, wherein the DSP bypass switch enables the network gateway to bypass the DSP resources in order to access a memory, and wherein the DSP resources process, at the network gateway, the digital voice data based on a selection of the command and variations in the amounts of incoming digital voice data that require processing through DSP resources and based on a current time period with respect to the plurality of time periods.

16. The system of claim 15, wherein the DSP resources are present in the network device.

17. The system of claim 15, wherein the DSP resources are present in a private branch exchange (PBX).

18. An apparatus comprising:

a processing system including a processor coupled to a display and user input device;

a non-transitory computer-readable storage medium including instructions executable by the processor comprising: one or more instructions for enabling a user interface that interacts with digital signal processing (DSP) resources on a network gateway, wherein the user interface enables an end-user to enter a command for allocating the DSP resources for processing digital voice data for transmission to the network gateway, wherein the network gateway is coupled to the DSP resources via a DSP bypass switch, wherein the DSP bypass switch enables the network gateway to bypass the DSP resources in order to access a memory;

one or more instructions dividing, at the network gateway, a time amount in a day into a plurality of time periods, wherein the time periods are based on amounts of incoming digital voice data that are configured for processing through DSP resources on a per network interface bases, wherein the time periods include at least one low-use time period and at least one high-use time period;

one or more instructions for receiving, at the network gateway, the command from the user interface, wherein the command indicates how to allocate the DSP resources for processing the digital voice data based on variations in the amounts of incoming digital voice data that require processing through the DSP resources and based on a current time period with respect to the plurality of time periods, and wherein a selection of the command is performed through the user interface; and one or more instructions for transporting, in the network gateway, the digital voice data based on the selection, whereby the digital voice data is transported through the DSP resources based on if the selection is performed to use the DSP resource.

19. The apparatus of claim 18, further comprising one or more instructions for determining a usage of DSP resources for a plurality of packets, wherein one or more packets of a first set of packets requires processing through the DSP resource, wherein one or packets of a second set of packets that does not necessarily require immediate processing through the DSP resource.

20. A method for controlling communications comprising:

dividing, at a network gateway, a time amount into a plurality of time periods, wherein the time periods are based on amounts of incoming digital voice data through the network gateway that are configured for processing through a digital signal processing (DSP) resource in the network gateway, wherein the time periods include at least one low-use time period and at least one high-use time period;

providing, through a user interface that interacts with the network gateway, command options to control the DSP resource, the command options providing an end user to indicate how to allocate the DSP resources for processing the digital voice data based on at least one of:

variations in the amounts of the incoming digital voice data that utilize processing through the DSP resources, and a current time period with respect to the plurality of time periods;

receiving a command from the user interface at the network gateway, the command based on an end-user selection from the command options;

routing, in the network gateway, the digital voice data based on the end-user selection, the digital voice data being routed through the DSP resources based on the command defining the use of the DSP resource.

* * * * *